(12) United States Patent
Donald (10) Patent No.: US 8,557,152 B2
(45) Date of Patent: Oct. 15, 2013

(54) FLOORING ELEMENT

(75) Inventor: Malcolm Roger Curzon Donald, Dumfreisshire (GB)

(73) Assignee: MRB Holdings Corporation, Alcoa, TN (US)

( * ) Notice: Subject to any disclaimer, the term of this patent is extended or adjusted under 35 U.S.C. 154(b) by 219 days.

(21) Appl. No.: 13/081,877

(22) Filed: Apr. 7, 2011

(65) Prior Publication Data

US 2011/0179746 A1    Jul. 28, 2011

Related U.S. Application Data

(62) Division of application No. 11/682,504, filed on Mar. 6, 2007, now abandoned.

(51) Int. Cl.
   *B29C 39/02* (2006.01)
   *E04G 21/00* (2006.01)

(52) U.S. Cl.
   USPC ............. 264/71; 264/255; 264/319; 264/294; 264/332; 425/432

(58) Field of Classification Search
   USPC ........ 264/255, 294, 299, 319, 332, 71, 72, 21
   See application file for complete search history.

(56) References Cited

U.S. PATENT DOCUMENTS

| | | | |
|---|---|---|---|
| 3,097,080 A | 7/1963 | Weir | |
| 3,242,242 A * | 3/1966 | Bournique | 264/71 |
| 3,344,011 A | 9/1967 | Goozner | |
| 3,419,454 A | 12/1968 | Hoffman | |
| 4,501,783 A | 2/1985 | Hiragami et al. | |
| 4,533,393 A * | 8/1985 | Neuschaeffer et al. | 106/18.12 |
| 4,715,743 A | 12/1987 | Schmanski | |
| 4,944,998 A | 7/1990 | Ko et al. | |
| 5,603,878 A * | 2/1997 | Jinno et al. | 264/71 |
| 5,637,236 A * | 6/1997 | Lowe | 216/39 |

(Continued)

FOREIGN PATENT DOCUMENTS

| | | |
|---|---|---|
| FR | 2190137 | 1/1974 |
| FR | 2590203 | 5/1987 |
| JP | 5141075 A | 6/1993 |

OTHER PUBLICATIONS

CRC Handbook of Chemistry and Physics, 89th ed. Ed. David Lide. New: CRC Press, 2009 (cited in Notices of References Cited, PTO Paper No. 20090218.

*Primary Examiner* — Joseph S Del Sole
*Assistant Examiner* — Nahida Sultana
(74) *Attorney, Agent, or Firm* — Knox Patents; Thomas A. Kulaga (57) ABSTRACT

A method of making a flooring element. The flooring element is a tile formed of a polymer with embedded filler material. The filler material includes abrasive particles adjacent the top surface and a resilient or rubber-like material. The bottom surface of the tile includes a plurality of particles embedded in and extending from the bottom, which enables the tile to be securely adhered to a substrate. One embodiment of a method of making the tile includes adding a first layer containing a filler material to a mold, vibrating the mold to cause the heavier filler material to sink, applying a plurality of particles to the top of the polymer mixture in the mold, and polymerizing the mixture in the mold. In another embodiment, a second layer including resilient particles is added to the mold above the first layer before the mold is vibrated.

12 Claims, 3 Drawing Sheets

(56) References Cited

U.S. PATENT DOCUMENTS

| | | | |
|---|---|---|---|
| 6,061,940 A * | 5/2000 | Rice | 40/594 |
| 7,029,744 B2 | 4/2006 | Horstman et al. | |
| 7,141,618 B2 | 11/2006 | Schneider et al. | |
| 2003/0215596 A1 | 11/2003 | Nolt | |
| 2004/0211130 A1 | 10/2004 | Horstman et al. | |

* cited by examiner

FLOORING ELEMENT

CROSS-REFERENCE TO RELATED APPLICATIONS

This application is a divisional of prior application Ser. No. 11/682,504, filed Mar. 6, 2007, which claims the benefit of Application Number 0605413.4, filed Mar. 17, 2006, in the United Kingdom, hereby incorporated by reference.

STATEMENT REGARDING FEDERALLY SPONSORED RESEARCH OR DEVELOPMENT

Not Applicable

BACKGROUND OF THE INVENTION

1. Field of Invention

This invention pertains to floor tiling, in general, and to tactile floor tiling, in particular. Tactile floorings have an uneven surface so that they can provide information about the surroundings to those walking on them, e.g., blind and partially-sighted people.

2. Description of the Related Art

There is an international standard for the designs and uses of tactile tiling, for example, tiles with 'blisters' arranged on a square pattern are used on pavements at the edges of pedestrian crossings, tiles with a triangular pattern are used near the edges of railway platforms, and tiles with regularly spaced parallel ridges are used at the tops and bottoms of stairs. In this context, the 'blisters' are about 25 mm in diameter, about 5 mm high, and spaced 67 mm apart. Such tiling is highly beneficial to blind people because the blisters can be detected by both a stick sweeping the ground in front of them and through the soles of their shoes. Tactile tiles may be provided in a contrasting color to that of the rest of the flooring so that sighted caregivers for blind persons and partially sighted people may be further warned of the impending hazard.

Tactile tiling is used both outside, e.g., in the street and public spaces, and inside, e.g., in public access areas, shopping malls, and locations particularly frequented by blind people. For outside use, the tiles are often cast from concrete or similar materials, but for inside use, they are usually made from polymeric materials, sometimes incorporating a degree of cushioning.

Figure 1:
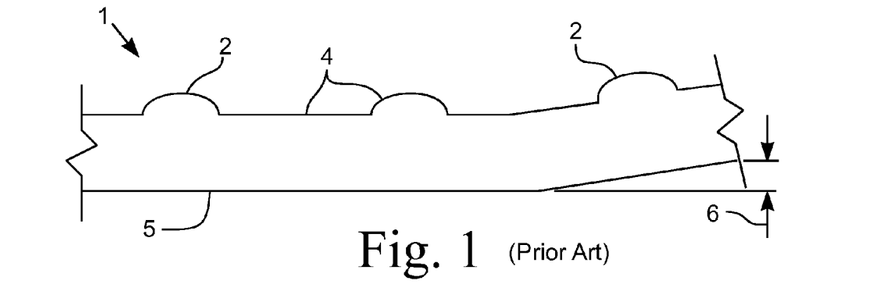
FIG. 1 is a side elevation of a prior art type of tactile floor tile.

FIG. 1 shows a current design of polymeric tile and some problems associated with it. Tile 1 consists of regularly spaced blisters 2 on a substrate 3. The upper face has a hard-wearing surface 4. Because of the shape and pattern of the blisters 2, tile 1 has to be cast upside down, i.e., with the blisters at the bottom of the mold, and so, lower surface 5 is the top surface in the mold. The mixture from which the tile is cast contains resin, hardener, and a filler, such as sand or grit particles.

In the manufacturing process. it is normal to fill the mold and then vibrate it to release trapped air bubbles and settle the mixture fully down into the mold. This vibrating process also causes the filler particles to settle in the resin mixture and leave a smooth surface at the top of the mold. Thus, after polymerization and removal from the mold, this smooth surface becomes lower surface 5 of tile 1. When the flooring is fitted, it is normal to bond tiles 1 adhesively to a wood or concrete foundation. A smooth surface 5 is not ideal for adhesive bonding. It is possible to roughen surface 5, e.g., with sandpaper, but this is not really practicable when working to deadlines. The result is that, in use, tiles frequently become wholly, or partly, unbonded and detached from the foundation.

Another problem that arises, occurs because the polymerization process continues after the tiles have been removed from the mold. If tiles 1 are not stored perfectly flat, e.g., they are placed on a slightly uneven surface or, perhaps, overlapping the edge of a pallet, it is possible that a 'kink', resulting in a 'permanent set', may occur. This is illustrated as displacement 6 in FIG. 1. Though the tile 1 may be 'bent straight' by the person laying the floor and then adhesively bonded to the substrate, the distortion 6 remains as an internal tensile stress. It is known that adhesive bonds are weak in tension and, especially when the adhesive is bonded to a smooth surface 5, failure of the bond is a high probability. Adhesive failure, whether due to the smooth surface 5, or exacerbated by a kink 6, is a common problem with the fixing of this form of tile.

There is thus a need for a form of tiling with a hard wearing surface and cushioned substrate, which can be bonded firmly to the flooring foundation and remains firmly bonded for the lifetime of the tile.

BRIEF SUMMARY OF THE INVENTION

According to various embodiments, apparatus for and methods of making a flooring element are provided. The methods include providing a mixture of a cross-linkable, polymerizable resin and a hardener filled with abrasion resistant particles characterized in that the abrasion-resistant particles are concentrated in the upper layer of the flooring element to give a high friction, wear resistant surface and further characterized in that a layer of abrasion resistant particles is incorporated into the base surface of the element prior to polymerization so that, after polymerization, it forms a rough backing layer integral with the flooring element, ideal for the adhesion of the element to the foundation plane to which the flooring element is to be bonded with an appropriate adhesive.

According to a first variation, the flooring element is cast upside down in a mold.

According to a second variation, the mold is filled with the polymerizable mixture, which is pressed into the mold.

According to a third variation, the mold is vibrated to ensure complete filling and removal of air bubbles in the polymerizable mixture.

According to a fourth variation, the vibration of the mold causes segregation of the various fillers within the resin mixture before polymerization occurs.

According to a fifth variation, the segregation process produces a layer of abrasion resistant particles at or near the base of the mold, which becomes the wearing surface of the flooring element.

According to a sixth variation, resilient, such as rubber, particles are included in the polymerizable mixture.

According to a seventh variation, the resilient particles are concentrated in the upper layer of the mold, which becomes a resilient substrate of the flooring element.

According to an eighth variation, the mold is provided with parts such that, after casting, polymerization, and removal from the mold, said parts creating areas of the flooring element which project above the plane of the wearing surface.

According to a ninth variation, the projecting areas have the form of partial spheres.

According to a tenth variation, the projecting areas have the form of a ridge.

According to an eleventh variation, the projecting areas have the form of parallel ridges with a groove between adjacent ridges.

According to a twelfth variation, the parts of the mold are pre-filled with a resin mixture containing a high concentration of the abrasion resistant particles before the other resin-filled mixture(s) is/are added to the mold.

According to a thirteenth variation, the pre-filling resin mixture contains a photo-luminescent additive.

According to a fourteenth variation, pre-manufactured items are located in the parts of the mold before the other resin-filled mixture(s) is/are added to the mold so that, after polymerization, the pre-manufactured items are bonded to the rest of the polymerized matrix.

According to a fifteenth variation, the viscosity of the polymerizable mixture is adjustable so that, during vibration prior to polymerization, adequate segregation occurs due to density differences with air bubbles rising and abrasion-resistant particles sinking.

According to a sixteenth variation of the method, the viscosity of the polymerizable mixture is adjusted by controlling one or more of the temperature, proportion of resin to hardener, and/or quantity of filler(s).

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

In the following description, the same reference number is used for the same component or for different components fulfilling an identical function.

Figure 2:
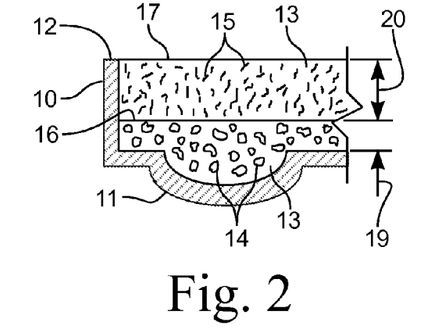
FIG. 2 is a part sectional elevation of a first embodiment showing the polymerizable mixtures in a mold.
Figure 3:
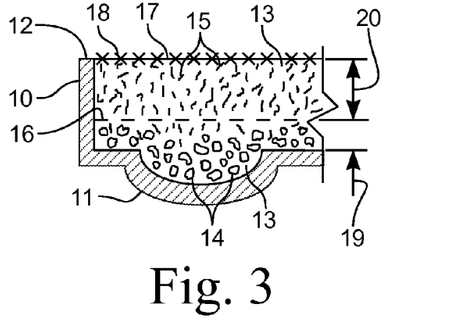
FIG. 3 is a part sectional elevation of the filled mold, shown in FIG. 2, after vibration and addition of the rough backing member.

Referring to FIGS. 2 and 3, the first embodiment provides for the resin hardener mixture to be added to mold 10 in two separate stages. In the first stage the resin and hardener are mixed with a silica sand and bauxite filler to form a uniform mixture and placed as a first layer 19 in mold 10. Mold 10 is provided with concave projections 11 so that the mixture 19 therein has convex blisters 2 after polymerization. As shown, first layer 19 is squeezed into the corners and blisters 11 and roughly leveled to give a surface 16, only partly filling mold 10.

In the second stage, a further batch of the same resin and hardener formulation is prepared, this time with a filler of resilient, or rubber, particles 15. As before, a uniform mixture is produced and added as a second layer 20 to mold 10 on top of surface 16 of first layer 19 so that the mold is now full. As shown in FIG. 2 the particles of sand and bauxite filler 14 and the resilient particle filler 15 are uniformly distributed throughout resin mixture 13 in their respective layers 19 and 20.

Mold 10 is now vibrated, primarily to settle the mixture in the mold and blisters 11 and to allow trapped air bubbles (not shown) to rise and leave the mold through surface 17. A secondary effect of the vibration is to cause the denser sand and bauxite particles to sink, thus collecting 14A near the bottom of mold 10, 11. This increases the wear resistance of the surface of the tile after polymerization.

Another effect of the vibration is to meld the two layers of polymer mixture together in the region of the boundary 16, which is now shown dashed 16A to indicate this local mixing of the two layers 19, 20. This process also causes some rubber particles 15 to be incorporated into the first layer 19, as shown. After vibrating, the resin surface 17 is leveled off with mold lip 12. As the same resin and hardener is used for both layers, melding of the two layers occurs naturally.

At this point in the process, the resin mixture has just started to polymerize and surface 17 is tacky. With the surface in this condition, a layer 18 of silica sand is placed on surface 17 so that the particles partly sink into tacky surface 17. If the silica particles do not sink sufficiently into the surface of the tacky resin, gentle pressure may be applied, e.g., with a roller, a flat board or builder's float. The mold is now placed in an oven and, in one embodiment, allowed to polymerize for three hours at 35° C. After this the tiles are removed from the molds, stacked horizontally on flat boards, and kept for 24 hours at ambient temperature. This allows them to cool naturally and the polymerization process to continue, essentially to completion. The tiles are then trimmed to size to remove any edge imperfections and packed into boxes for distribution. As previously, the boxes are kept horizontal and flat though any further polymerizing set is unlikely.

In one application of the first embodiment of the process, the formulation is:

Resin Mixture

Resin, e.g., Nufins P U Casting Resin

Hardener, e.g., Nufins Casting Resin Hardener

The resin is mixed at the rate of between 2.5 to 4.0 parts per 1.0 part of hardener, by weight.

First Layer

Silica sand filler, passing a 0.5 to 1.0 mm mesh screen, 90 wt. %

Bauxite filler, passing a 0.5 to 1.0 mm mesh screen, 10 wt. %

The filler mixture is gradually added to the resin mixture above until a rate of 65 to 72 wt. % is achieved, i.e., 35 to 28 wt. % resin. 1 to 2 wt. % pigment may be added in lieu of an equivalent quantity of filler. Mixing under a vacuum is not essential.

Second Layer

Equal parts of rubber particles, passing a 40 mesh screen and a 26 mesh screen, are mixed together and added progressively to the above resin mixture until a rate of 10 wt. % to 90 wt. % resin is achieved. As the rubber particles do not pack well, there is a much greater volume of rubber than resin and the rubber particles float on the resin. Thus, mixing involves thoroughly wetting the particles and kneading the whole to distribute the particles evenly.

Vibration: 15 to 60 seconds, depending on the viscosity of the resin/hardener mixture Backing Layer 0.2 to 0.7 mm silica sand particles are sprinkled on to the tacky polymer surface to give a uniform covering. Normally, the particles partly sink into the polymer matrix and bond with the matrix. However, gentle pressure is applied, if required. Before removal from the molds and, after polymerization, the tiles are inverted and brushed gently to remove unbonded particles Polymerization 3 hours at 35° C. in an oven, followed by removal from the molds and 24 hours at room temperature, with each tile horizontally on a flat board. The resin system taught is fully cross-linked throughout the matrix but is also thermoplastic, which assists the fitters when laying the tiles.

In the embodiment where the tiles are for outdoor applications, an ultra-violet fight stabilizing agent is added, along with the fillers, to the first layer only. (The agent is very expensive and not required in the second layer.)

Figure 4:
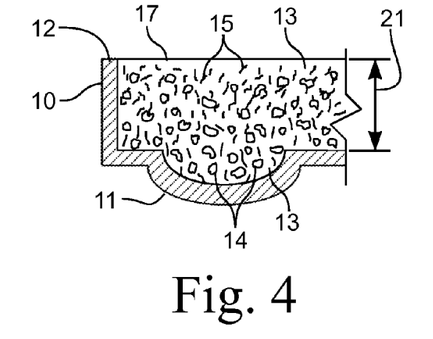
FIG. 4 is a part sectional elevation of a second embodiment showing the polymerizable mixture filling the mold.
Figure 5:
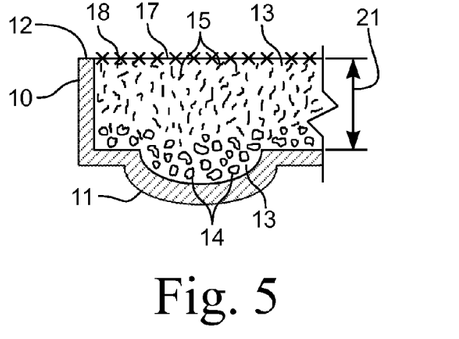
FIG. 5 is a part sectional elevation of the mold, shown in FIG. 4 after vibration and addition of the rough backing member.

Referring to FIGS. 4 and 5, the second embodiment provides for the resin hardener mixture to be added to mold 10 in a single stage. The resin and hardener are mixed as before and the silica sand, bauxite, and rubber filler added to form a single uniform mixture. From a practical point of view, it is desirable to add the less dense rubber particles first because they float and it is easier to disperse the rubber particles into a free flowing liquid than after the silica sand and bauxite mixture have been added.

As before, the mixture is pressed and squeezed into the corners and blisters 11, filled 17 to the brim, and vibrated to allow buoyant air bubbles (not shown) to rise to the surface and to allow the mixture to fill the mold 10, 11 completely with surface 17 aligning with lip 12. During the vibration, as explained previously, the silica sand (density 7.5-2.1) and bauxite (density 3.9) particles settle 14A to the lower part of mold 10, 11, through the resin (density c. 0.9) to give a denser packing 14A at the base of the mold, and especially in the blisters, to give greater wear resistance to the tile after polymerization. Though more expensive, the denser bauxite particles settle more quickly during the vibration period and so enhance the wear resistance of the surface. In this case, the rubber particles (density c. 0.9) remain distributed uniformly throughout the single layer 21.

Close examination of the tile after polymerisation shows that the sand and bauxite particles are often surrounded by a layer of the smaller rubber particles, which provides an excellent bond for the sand and bauxite, i.e., it promotes the wear resistance of the tile surface 4.

As before, silica sand particles 18 are added to the tacky surface 17 and become an integral part of layer 17. This is shown in FIGS. 3 and 5 with the cross symbols representing these particles passing through the surface 17 into the resin mixture 20 and 21 respectively.

In an application of the second embodiment of the process, the formulation is:

Resin Mixture: As described above.

Fillers

Silica sand and bauxite filler mixture. as above, 60 to 70 wt. %

Rubber particles, as described above, 3 to 10 wt %

The rubber and inorganic fillers are added progressively to the resin mixture, as described above, until a rate of 62 to 75 wt. % is achieved, i.e., 38 to 25 wt. % resin. 1 to 2 wt. % pigment may be added in lieu of an equivalent quantity of filler. Again, mixing under a vacuum is not essential, but the mixing process is maintained for an adequate time to ensure homogeneity.

Vibration, Backing layer, and Polymerization: As described above.

As shown in FIGS. 3 and 5, it is a feature of the method that the vibration process leads to segregation 14A of the denser inorganic fillers relative to the rest of the mixture 19, 20 and 21. The parameter affecting this segregation process is the viscosity of the bulk mixture, after adding the fillers. Raising the temperature of the resin and hardener reduces the viscosity, as does adding less of the fillers. However, to maximize wear resistance requires a large amount of the inorganic filler and that the filler be located at, or close to, the surface of the tile, (i.e., 4 in FIG. 1). Similarly, to maximize cushioning requires the maximum quantity of rubber particles. Thus, there are conflicting requirements and the formulation range given allows the skilled person to select an appropriate balance for any particular application.

Increasing the ratio of resin to hardener, i.e., reducing the amount of hardener for a given quantity of resin, slows down the rate of polymerization. As the polymerization increases the viscosity, reducing the rate of polymerization allows the segregating effect of the vibration to become relatively more pronounced. This feature is implicit in the recommended resin mixture rate of between 2.5 to 4.0 parts per 1.0 part of hardener, by weight.

In one embodiment of the method, the resin, hardener, and fillers are stored in a temperature-controlled room at 20° C., together with the mixer and vibrator. Thus, the whole manufacturing process is conducted in a constant temperature environment.

It is also noted that, in the single layer mixture 21, some of the inorganic particles e g. those numbered 14 in FIG. 4 have a greater distance to settle to reach zone 14A, than ones in the lower part of mold 10. Thus, for the single layer application 21 (FIGS. 4 and 5), either a lower viscosity and/or a longer vibration time is required. However, the polymerization process is continuing all the time and vibration generates heat in the mixture, which accelerates the polymerization. This emphasizes the importance of the initial viscosity of the resin-hardener mixture. Typical vibration times are 15-60 seconds for both the two layer system (FIGS. 2 and 3) and the single layer system (FIGS. 4 and 5).

Having explained the method and its application to the manufacture of flooring tiles, specific developments of the principle will now be taught.

Figure 6:
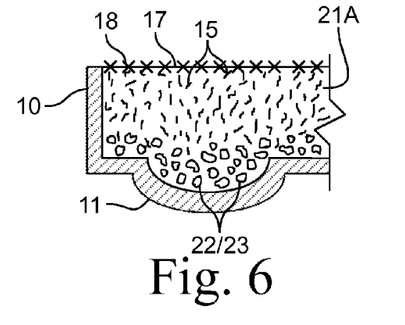
FIG. 6 is a part sectional elevation of a mold, the blister of which has been pre-filled with a resin mixture containing a high concentration of the abrasion resistant particles before the other resin-filled mixture(s) is/are added to the mold and after the settling and segregation caused by the vibrating of the mold and its contents.
Figure 7:
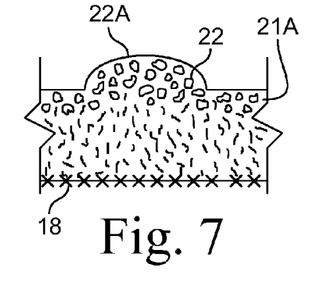
FIG. 7 is a part sectional elevation of the floor tile, shown in FIG. 6, after polymerization.
Figures 10, 11:
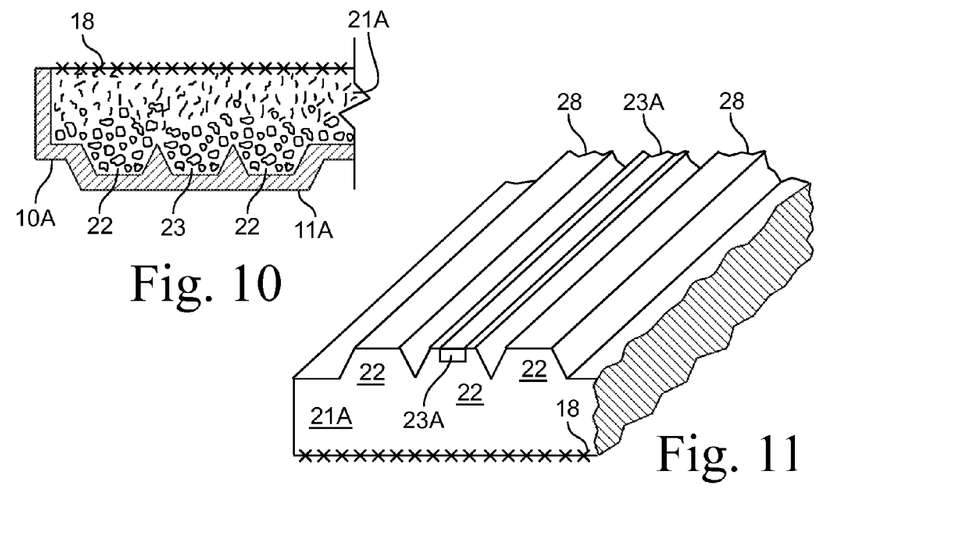
FIG. 10 is a part sectional elevation of a mold having parts to form ridges in the floor tile and which parts have been pre-filled with a resin mixture containing a high concentration of the abrasion resistant particles before the other resin-filled mixture(s) is/are added to the mold and after the settling and segregation caused by the vibrating of the mold and its contents.
FIG. 11 is a part sectional elevation of a floor tile, such as one cast in the mold shown in FIG. 10 and showing one embodiment of the incorporation of a photo-luminescent strip.

The principle of two layered manufacture has been explained (FIGS. 2 and 3) and, in other embodiments, the number of layers is increased to three layers. In such a case, a resin/hardener mixture is prepared as usual but loaded with a higher than normal concentration of sand/bauxite filler and the resulting mixture 22 placed in the blisters 11 (FIG. 6) or ridge-forming channels 11A (FIG. 10). An injection means, such as a mastic gun (not shown), is used to place the required quantity of mix 22 in place. After filling molds 10 or 10A with one or two additional layers, as taught above, the effects of the vibration melds the adjacent layers together at their boundary layers. After polymerization, highly wear-resistant blisters 22A (FIG. 7) or ridges 28 (FIG. 11) are created.

Another embodiment is to incorporate illumination into the tiling. This is done by placing pre-formed glass "cats' eyes" 24 (FIG. 8) into blisters before adding resin 21A. In this embodiment, a blob of adhesive 27, e.g., a blob of grease or a weak adhesive (such as used on memo-attachment notes) is used to hold the cat's eye 24 in place so that the resin mixture 21A can fill gap 25 during the vibration and thus hold the cat's eye 24 firmly after polymerization (FIG. 9). As shown 26A, 26B, incident light is refracted into cat's eye 24, reflected from rear surface 24A and re-emitted 26A, 26B. As shown, the lip 25 grips cat's eye 24, as well as via the adhesion of the resin mix 21A to the surface 24A. In various embodiments, the cats' eyes 24 are pure glass elements or cast from a glass particle/resin mixture. The glass may be plain or colored, as desired. The effect is enhanced if the tiles are illuminated by low-level, glancing lighting.

Figure 8:
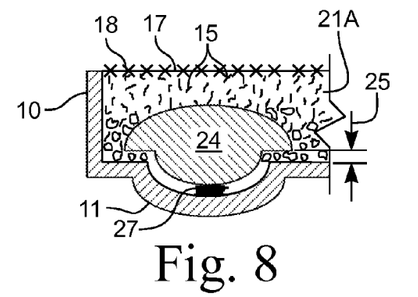
FIG. 8 is a part sectional elevation of a mold, into which an optical element has been placed before filling with the resin mixture(s) and after vibrating the mold and its contents to settle the resin mixture around the optical element and cause segregation of the fillers within the mixture(s)
Figure 9:
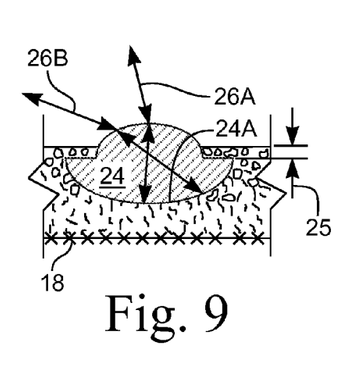
FIG. 9 is a part sectional elevation of the floor tile shown in FIG. 8, after polymerization.

A still another embodiment is to incorporate a photo-luminescence substance into a concentrated filler 22, as shown by numeral 23 (FIGS. 8 and 10). Such a substance absorbs incident light and emits it after dark or if the lights failed, e.g., during a fire emergency. In FIG. 10, a photo-luminescent mixture is used for one ridge 23 located between two highly wear-resistant ridges 22 to give added protection. In FIG. 11, either a pre-formed photo-luminescent strip 23A is incorporated into ridge 22, e.g., using the same method as for cats' eye 24, or a separate photo-luminescent liquid-resin mixture is injected into the appropriate channel 11A, before resin mixtures 22, 21A are added.

Flooring elements made according to the method are an improvement over present tactile floor tile technology by optimizing the resin system and the actual location of the wear resistant and cushioning components within the tile itself. The skilled person will appreciate the variations of the method of the teaching, all of which are implicit in the disclosure.

Figure 12:
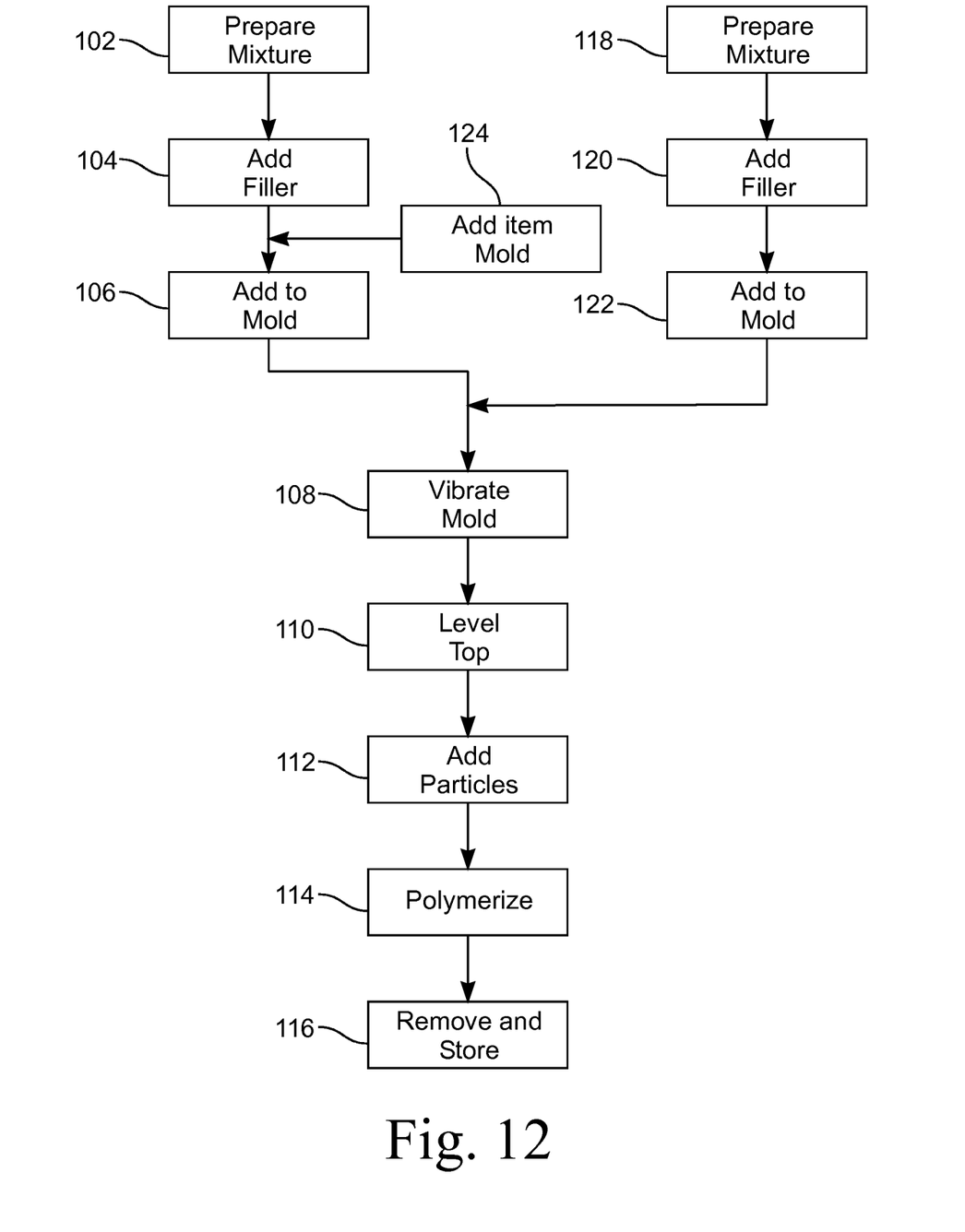
FIG. 12 is a flow diagram of one embodiment of the method.

FIG. 12 illustrates a flow diagram of various embodiments of the method of making a flooring element tile 1. In the first embodiment, the first step 102 is to prepare a mixture of resin and hardener, followed by the step 104 of adding the filler, which is an abrasion resistant material. This combination is then added to the mold 106 as a first layer. Along a parallel path, a step 118 of preparing a mixture of resin and hardener, followed by the step 104 of adding the filler, which is a resilient material, such as rubber or a rubber-like material. This combination is then added to the mold 122 as a second layer, after the first layer has been added to the mold 106. After the mold is filled, the next step 108 is to vibrate the mold, followed by the steps 110, 112 of leveling the top and adding particles to the top surface. The next step 114 is to polymerize the tile in the mold. After polymerization, the next step 116 is to remove the tile from the mold and temporarily store the tile flat while the tile completes curing.

In a second embodiment, mixture is prepared 102, and the filler is added 104, with the filler including both abrasion resistant material and resilient material. The mold is then filled 106 with only a single layer and steps 118, 120, 122 for a second layer are not performed.

In a third embodiment, before the first layer is added 106 to the mold, the step 124 of adding an item to the mold is performed. The item includes pre-formed reflective items, cats' eyes 24, and/or pre-formed photo-luminescent strip 23A. In other embodiments, a third layer is added to the mold.

According to a first embodiment of the method, the flooring element is cast into a mold in two layers, the first layer comprising a mixture of a cross-linkable, polymerizable resin and a hardener filled with abrasion resistant particles and placed in the mold 106 first to form a wear-resistant surface layer and a second layer comprising a mixture of a cross-linkable, polymerizable resin and a hardener filled with rubber particles and placed in the mold 122 on top of the first layer to form a resilient substrate and a layer of abrasion resistant particles is incorporated into the base surface of the element, prior to polymerization so that, after polymerization 114, it forms a rough backing layer integral with the flooring element, ideal for the adhesion of the element to the foundation plane to which the flooring element is to be bonded with an appropriate adhesive.

According to first variation of the first embodiment of the method, the mixture forming the first layer of the flooring element includes a component to stabilize the polymerized element against the effects of ultra violet light.

According to second variation of the first embodiment of the method, the vibration of the mold causes intermixing of the first and second resin, hardener and filler layers, so that the two layers polymerize together to form effectively a single layer with different concentrations of fillers in different parts of said single layer.

According to a second embodiment of the method, the flooring element is cast from a single mixture of a cross-linkable, polymerizable resin and a hardener filled with both abrasion-resistant particles and rubber particles, placed in a mold and the mold and its contents vibrated for a period of time sufficient to allow air bubbles to rise out of the mixture and for the denser abrasion-resistant particles to sink towards the bottom of the mold to form a wear resistant surface layer to the element with most of the rubber particles remaining in the bulk of the mixture to form a resilient substrate and a layer of abrasion resistant particles is incorporated into the base surface of the element, prior to polymerization, so that, after polymerization, it forms a rough backing layer integral with the flooring element, ideal for the adhesion of the element to the foundation plane to which the flooring element is to be bonded with an appropriate adhesive.

In one such embodiment of the method to produce a floor tile, a resin and hardener mixture is prepared and abrasion-resistant and rubber particle fillers are progressively added to the mixture, with thorough mixing between each addition. When the full quantity of fillers has been added, a mold is filled with the mixture, which is gently pressed into place. The mold, with its mixture, is then vibrated for a period of time during which any air bubbles rise to the surface and the denser fraction of the fillers sinks towards the bottom of the mold. This segregation of the denser, abrasion-resistant fillers to the bottom of the mixture in the mold, which becomes the hard-wearing surface of the flooring element, is a feature.

After the mold has been vibrated for the required period of time, the upper surface of the mixture is leveled off with the top of the mold and silica sand particles are sprinkled onto the tacky surface of the mixture, where the particles partly sink into the resin mixture. Gentle pressure may be applied to the silica particles, if they do not sink sufficiently into the resin mixture.

After polymerization in an oven, when the silica sand particles on the surface of the mixture become firmly bonded to the polymer matrix, the tile is removed from the mold and placed on a flat, level surface for a further period of time, at ambient temperature, to allow the polymerization to proceed to completion. The tiles, thus prepared, are then ready to be supplied for use. Particular advantages of the tile are that it is flexible and so may be fitted on slightly uneven surfaces. The rough surface of the silica particle backing is ideal for adhesive bonding to the floor foundation and the concentration of abrasion-resistant particles gives a hard-wearing surface, If the tiles are to be used outside, stabilization against UV light is desirable, as the stabilizing agent is very expensive, it is desirable to concentrate it in the surface layer of the tile. This is done by preparing the resin mixture in two parts. In the first part, only the abrasion-resistant particles and UV agent are used as fillers and this mixture is placed in the mold first and pressed down to give a first layer. In the second part, only rubber particle filler is used and this mixture added to the mold as a second layer. The effect of the vibration is both to cause the abrasion-resistant particle to sink, as before, but also to cause mixing between the two layers and give an essentially uniform matrix for polymerization.

In one embodiment of a mold, partial spherical depressions are provided in the base so that flooring tiles made from the mold have raised 'blisters', which blind and partially sighted people can detect, either with a stick or through the soles of their feet. In another embodiment of a mold, parallel channels are provided in the base so that the tiles have raised parallel ridges, separated by grooves.

In one application of the molds of these designs, a resin/hardener mixture with a high concentration of abrasion resistant particles is used to fill the depressions before the normal resin mixture(s) is/are added. The vibration causes a degree of mixing at the interface between any two adjacent mixture layers so that there are no plane(s) of weakness between the adjacent layers. An advantage of this is that the raised parts, which are most prone to wear, are also the most wear-resistant. If a photo-luminescent additive is incorporated into the mix for the raised parts, it absorbs light and re-emits it, e.g., after dusk or during a fire alert.

In a further embodiment, pre-formed reflective items are placed in all or some of the depressions to catch and reflect incident light, as "cats' eyes" do on roads. This further emphasizes the presence of the tiling (and the hazard to which it refers). The effect is enhanced if the tile is illuminated by low level, glancing light.

From the foregoing description, it will be recognized by those skilled in the art that an apparatus for tactile flooring elements and a method of making tactile flooring elements. such as tiles has been provided. The tiles 1 have an upper surface that includes abrasion resistant material and the bottom of the tiles 1 include a surface that is rough and suitable for adhesively attaching to a substrate. The tiles 1 also include, in one embodiment, a resilient filler disposed between the upper and bottom surfaces of the tile 1 so as to provide a cushioning effect for the tile 1.

In one embodiment, a flooring element comprising: a tile having a top surface and a bottom surface, said bottom surface being substantially planar, said tile formed as a single piece of a polymer having a first concentration of a plurality of first particles and a second concentration of said plurality of first particles, said plurality of first particles including a plurality of abrasion resistant particles, said first concentration greater than said second concentration, said first concentration proximate said top surface of said tile and said second concentration proximate said bottom surface; and a plurality of second particles embedded in and extending from said bottom surface of said tile.

In one such embodiment, the flooring element above wherein said tile includes a plurality of resilient material pieces embedded in said polymer. In another such embodiment, the flooring element above wherein selected portions of said top surface of said tile includes a photo-luminescent material. In yet another such embodiment, the flooring element above wherein said top surface of said tile includes a plurality of protrusions extending away from said bottom surface, said plurality of protrusions selected from a group including a plurality of blisters integral with said tile, a plurality of pre-formed reflective items embedded in said polymer, and a plurality of ridges integral with said tile. In still another such embodiment, the flooring element above wherein said top surface of said tile includes a component to stabilize said top surface against ultra-violet light.

In another embodiment, a flooring element comprising: a mixture of a polymerizable resin, a hardener, and a filler material, said filler material including abrasion resistant particles, said flooring element having a thickness defining at least a first and a second region, wherein said first region has a concentration of said abrasion resistant particles that is greater than that of said second region.

In one such embodiment, the flooring element above further including an upper surface and a lower surface, and wherein said first region is provided at the upper surface. In one such embodiment, the flooring element further includes a third region provided at said lower surface, wherein said third region has a concentration of said abrasion resistant particles that is greater than that of said second region.

In another such embodiment, the flooring element above wherein said flooring element is a tactile tile. In yet another such embodiment, the flooring element above wherein said filler material comprises a first set of abrasion resistant particles and a second set of abrasion resistant particles, the first set of abrasion resistant particles having a density that is higher than that of the second set. In one such embodiment, the flooring element wherein said first set of abrasion resistant particles includes one or both of sand and bauxite. In another such embodiment, the flooring element wherein said second set of abrasion resistant particles includes a resilient material.

In still another such embodiment, the flooring element above wherein said mixture includes a photo-luminescent additive. In still yet another such embodiment, the flooring element above wherein said mixture includes a component to stabilize said first region against the effects of ultra violet light.

The method includes providing a mixture of a cross-linkable, polymerizable resin and a hardener filled with abrasion resistant particles characterized in that the abrasion-resistant particles are concentrated in the upper layer of the flooring element to give a high friction, wear resistant surface and further characterized in that a layer of abrasion resistant particles is incorporated into the base surface of the element, prior to polymerization so that, after polymerization, it forms a rough backing layer integral with the flooring element, ideal for the adhesion of the element to the foundation plane to which the flooring element is to be bonded with an appropriate adhesive.

In one embodiment, rubber particles are also included in the resin-filler mixture to provide cushioning in the substrate of the tile. The resin-filler mixture is applied to the mold either in a single layer or in multiple layers.

A feature of the method is that the viscosity of the resin mixture is carefully controlled so that, during the period of vibration to settle the mixture fully into the mold, segregation of the filler(s) occurs within the resin mixture. The denser abrasion resistant particles sink through the resin mixture towards the base of the mold, which is the wearing surface of the tile, after polymerization and removal from the mold. The mold may be provided with parts to create areas of the tile, which project above the plane of the surface of the tile. Means to increase the wear resistance of the projecting areas and to incorporate means of illuminating parts of the tiles are taught.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method of making a flooring element, the method
   a) including a first set of abrasion resistant particles in a filler material, said first set of abrasion resistant particles having a density that is greater than a density of a polymerizable resin such that said first set of abrasion resistant particles moves to a lower portion of a volume of said mixture during said step d) of treating said mixture to define a first region;
   b) including a second set of abrasion resistant particles in said filler material, said first set of abrasion resistant particles having a density that is higher than that of said second set of abrasion resistant particles;
   c) adding a first layer of a mixture of said polymerizable resin, a hardener, and said filler material including abrasion resistant particles to a mold prior to polymerization of the mixture;
   d) treating said mixture so that there is movement of said abrasion resistant particles to define at least said first and a second region of said mixture, wherein said first region has a concentration of abrasion resistant particles which is greater than that of said second region; and
   e) polymerizing said first layer wherein prior to completion of said step e) of polymerizing and after said step c) of adding a first layer including said second set of abrasion resistant particles in said mixture, performing the step of
   e1) adding a third set of abrasion resistant particles to said mold, said step of adding said third set including defining a third region of said mixture, said third region having a concentration of said third set of abrasion resistant particles that is greater than that of said second region.

2. The method of claim 1 wherein said step d) of treating said mixture includes a step of vibrating said mixture.

3. The method of claim 1 further including the steps of removing the flooring element from said mold and deploying the flooring element such that said first region is adjacent an upper surface of the flooring element, and said upper surface configured to be tread upon when said flooring element is deployed.

4. The method of claim 1 further including, before said step c) of adding said first layer of said mixture, a step of ensuring said first set of abrasion resistant particles includes at least one of sand and bauxite.

5. The method of claim 1 further including, before said step e) of polymerizing said mixture, a step of adding a second layer of said mixture in said mold, said second layer including said second set of abrasion resistant particles, and said step e) of polymerizing including polymerizing said second layer.

6. The method of claim 5 further including, prior to step e) of polymerizing said mixture, a step of vibrating said mold to cause intermixing at a boundary of said first and second layers.

7. The method of claim 1 wherein said step b) of including said second set of abrasion resistant particles includes ensuring said second set of abrasion resistant particles includes a resilient material.

8. The method of claim 1 further including, before said step c) of adding said first layer of said mixture, a step of providing at least one cavity at said mold to create at least one protrusion of the flooring element.

9. The method of claim 1 further including, after said step c) of adding said first layer of said mixture, the step of pressing said mixture within said mold.

10. The method of claim 1 further including, in said step c) of adding said first layer of said mixture, a step of adding a photo-luminescent additive to said mixture.

11. The method of claim 1 wherein said step c) of adding said first layer of said mixture includes the step of adjusting a viscosity of said mixture to aid in formation of said first and second regions formed during said step d) of treating.

12. The method of claim 1 further including, in said step c) of adding said first layer of said mixture, a step of adding to said mixture a component to stabilize said first layer against any effects of ultra violet light.

* * * * *